United States Patent
Lanz

(10) Patent No.: US 8,109,530 B2
(45) Date of Patent: Feb. 7, 2012

(54) PINNED BICYCLE HEADSET AND BICYCLE COMPRISING SUCH A HEADSET

(75) Inventor: Matthieu Lanz, Nevers (FR)

(73) Assignee: Look Cycle International, Nevers (FR)

(*) Notice: Subject to any disclaimer, the term of this patent is extended or adjusted under 35 U.S.C. 154(b) by 0 days.

(21) Appl. No.: 12/967,594

(22) Filed: Dec. 14, 2010

(65) Prior Publication Data

US 2011/0148070 A1 Jun. 23, 2011

(30) Foreign Application Priority Data

Dec. 21, 2009 (FR) .................................. 09 59315

(51) Int. Cl.
*B62K 19/32* (2006.01)
(52) U.S. Cl. ........................................ 280/280; 280/279
(58) Field of Classification Search .................. 280/279, 280/276, 280; 29/428
See application file for complete search history.

(56) References Cited

U.S. PATENT DOCUMENTS

| | | | |
|---|---|---|---|
| 5,332,245 A | 7/1994 | King | |
| 5,775,709 A * | 7/1998 | Chen | 280/279 |
| 6,234,506 B1 * | 5/2001 | Li | 280/280 |
| 7,703,786 B1 * | 4/2010 | Domahidy et al. | 280/280 |
| 7,796,045 B2 * | 9/2010 | Spear et al. | 340/573.1 |
| 2003/0059145 A1 | 3/2003 | Couturet | |
| 2008/0100026 A1 | 5/2008 | Bouchez | |
| 2011/0121537 A1 * | 5/2011 | Lin | 280/279 |

FOREIGN PATENT DOCUMENTS

| | | |
|---|---|---|
| EP | 0520383 A1 | 12/1992 |
| EP | 1162133 A2 | 12/2001 |
| EP | 1298048 A1 | 4/2003 |
| EP | 1916182 A1 | 4/2008 |
| FR | 973520 A | 2/1951 |
| FR | 2829989 A1 | 3/2003 |
| FR | 2907756 A1 | 5/2008 |

OTHER PUBLICATIONS

French Search Report, dated Sep. 2, 2010, from corresponding French application.

* cited by examiner

*Primary Examiner* — Tony Winner
(74) *Attorney, Agent, or Firm* — Young & Thompson

(57) ABSTRACT

The headset includes upper and lower rolling bearings (8, 9) housed inside the head tube so as to allow relative rotation of the steering tube, and clamping elements (18, 21) for axially clamping the lower and upper bearings (8, 9) against, respectively, a lower end and an upper end of the head tube. The axial-clamping elements include a threaded sleeve slipped over the steering tube. This sleeve is secured to the steering tube by connecting elements including a pin extending through two diametrically opposed holes in the threaded sleeve and through two diametrically opposed holes provided in the steering tube. The sleeve collaborates with a tapped annular cap slipped over the steering tube so as to force the upper bearing downward as the annular cap is screwed onto the sleeve.

12 Claims, 2 Drawing Sheets

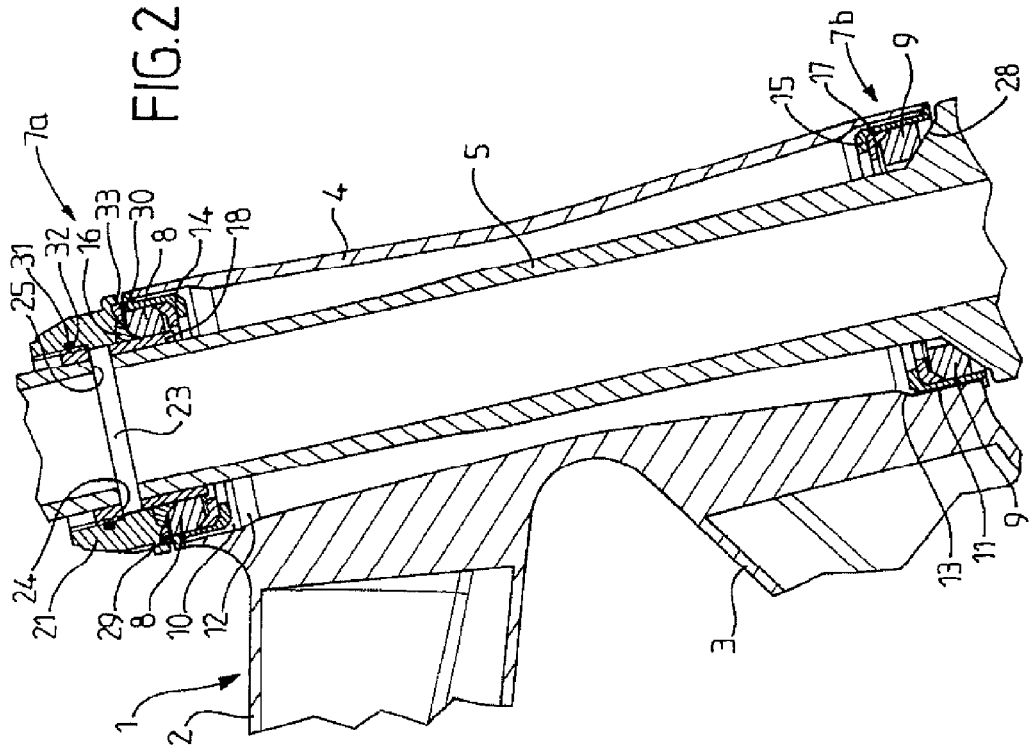
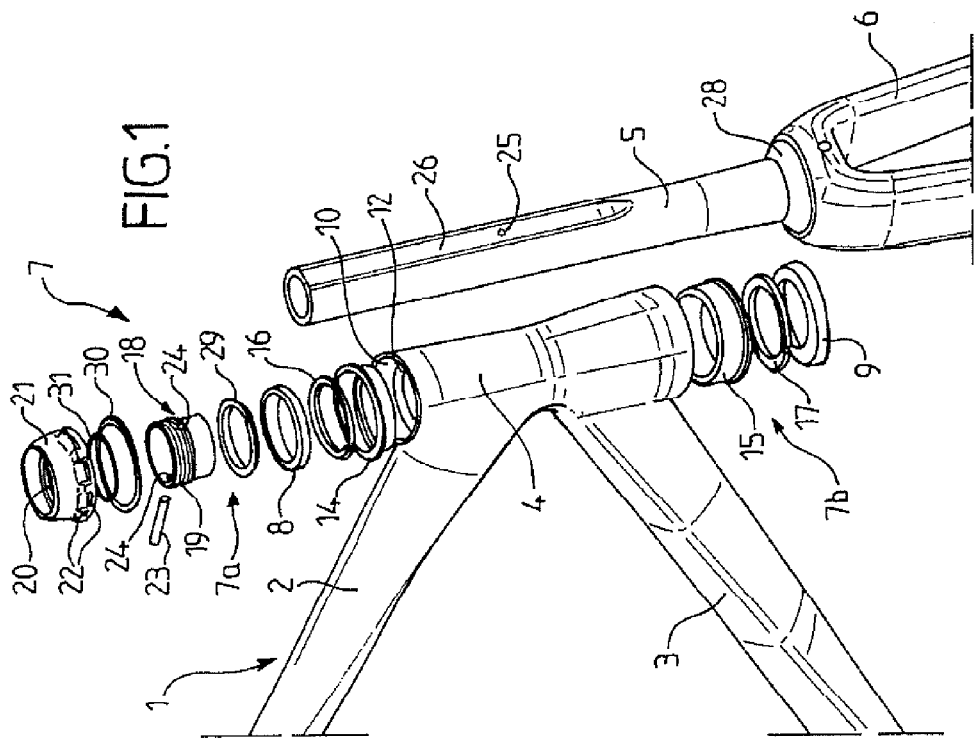

PINNED BICYCLE HEADSET AND BICYCLE COMPRISING SUCH A HEADSET

BACKGROUND OF THE INVENTION

The present invention relates to a bicycle headset used for connecting a steering tube to a head tube that forms part of bicycle frame.

To this end, any headset comprises a lower bearing and an upper bearing, these generally being rolling bearings, which create a connection allowing the steering tube to turn with respect to the head tube. It also comprises means of axially clamping the lower and upper bearings against, respectively, a lower and an upper end of the head tube.

The lower bearing and upper bearing axial-clamping means in conventional headsets generally comprise a plug situated at the top of the steering tube and bearing against the interior thereof by way of an expander.

DESCRIPTION OF THE PRIOR ART

One problem that arises in known headsets is that of compensating for play in the bearings and of axially holding the handle bar stem on the steering tube. This problem is generally solved using the device described in the applicant company's patent FR2829989 which proposes the use of adapters in the form of spacer pieces that make it possible to achieve the desired height and to the clamp the bearings.

Another example of a headset in which bearing play can be compensated is described in U.S. Pat. No. 5,332,245. In that patent, a tapered compression ring is used and slidably mounted on the steering tube to immobilize the upper bearing against the head tube. Lock nuts surround the compression ring so that the ring can be clamped against the steering tube when they work together.

A novel type of headset comprising means of axially clamping the lower and upper bearings is described in the applicant company's patent FR2907756. In that document, the clamping means comprise a circular groove provided on the exterior face of the steering tube and collaborating with a rib on an elastically deformable annular element positioned on top of the upper bearing of the headset so as to apply downward thrust on this bearing.

Even though these axial-clamping means are generally satisfactory, they can constitute a disadvantage when carbon fiber is used in the manufacture of the steering tube which is then manufactured as one piece with the forks. More specifically, the circular groove made in the periphery of the steering tube severs the carbon fibers and the entire assembly becomes weaker at this point.

When that material is being used, it is therefore desirable to avoid making an annular rib on the steering tube.

Also known is a headset in which the means of axially clamping the rolling bearings comprise a threaded ring bonded to the steering tube to collaborate with a tapped annular cap which, when screwed onto the threaded ring, forces the upper bearing downward to clamp the rolling bearings at the ends of the head tube of the frame. The use of adhesive causes the headset to take longer to manufacture and also not to be fully dismantleable given that the ring is bonded to the steering tube.

SUMMARY OF THE INVENTION

It is an object of the invention to solve all these disadvantages of known headsets by proposing a headset in which the steering tube has no circular groove and in which the means of clamping the lower and upper bearings clamp the bearings effectively while at the same time allowing full and easy dismantling of all the parts of the headset whenever such dismantling proves necessary.

The subject of the invention is a bicycle headset capable of connecting a steering tube to a head tube that forms part of a bicycle frame, made up of an upper part comprising an upper bearing and of a lower part comprising a lower bearing, said upper and lower bearings being housed inside the head tube so as to allow the steering tube to turn with respect thereto, and clamping means for axially clamping said lower and upper bearings against, respectively, a lower end and an upper end of the head tube, said axial-clamping means comprising, in the upper part of the headset, a threaded sleeve slipped over the steering tube, said threaded sleeve being secured to the steering tube by connecting means and is able to collaborate with a tapped annular cap slipped over the steering tube so as to force the upper bearing downward as said tapped annular cap is screwed onto said threaded sleeve, in which said connecting means comprise a pin extending through two diametrically opposed holes in the threaded sleeve so as to be housed in two diametrically opposed holes provided in the steering tube so as to connect the threaded sleeve to the steering tube in terms of rotation and in terms of translation.

According to other features of the invention:
- as said threaded sleeve is being mounted on the steering tube, said diametrically opposed holes in the threaded sleeve and said diametrically opposed holes in the steering tube are aligned with one another by guide means comprising a recess and a projection of complementary shape which are provided in the interface between said threaded sleeve and the steering tube;
- said recess has a flat provided on the exterior face of the steering tube, this extending as far as the free end of the steering tube to collaborate with a projection constituting an additional thickness of complementary shape provided on the interior face of said threaded sleeve at the site of one of its two opposed holes;
- two flats are provided on the exterior face of the steering tube, these extending as far as the free end of the steering tube to collaborate with two projections constituting additional thicknesses of complementary shape provided on the interior face of said threaded sleeve at the site of its two opposed holes;
- the greater part of said tapped annular cap can be housed inside the head tube and the latter comprises, near its upper end, two diametrically opposed holes allowing said pin to be fitted and removed;
- said tapped annular cap at its upper end has a flange which, after assembly, is situated outside the head tube so as to extend on the upper end thereof;
- said holes in the head tube are closed by plugs to seal them;
- said annular cap on its upper surface is provided with recesses evenly distributed around the central hole in said annular cap and able to collaborate with a suitable tool so that said annular cap can be turned when the headset is being assembled or disassembled;
- at least two diametrically opposed recesses are provided on the upper surface of said annular cap;
- when the tapped annular cap is screwed onto the threaded sleeve, it passes over the holes in the threaded sleeve so as to trap the pin 23 in its fitted position.

The invention also relates to a bicycle comprising a headset that has the abovementioned features.

BRIEF DESCRIPTION OF THE DRAWINGS

Other features and advantages of the invention will become apparent from the following description of two nonlimiting embodiments of the invention, which are given with reference to the accompanying drawings in which:

FIG. 1 is an exploded perspective view showing part of a bicycle frame with its head tube, part of the forks including the steering tube thereof, and all the parts of the headset according to a first embodiment of the invention;

FIG. 2 is a view in section of the headset of FIG. 1, after it has been assembled onto the head tube of the bicycle frame;

Only those elements that are directly concerned with the invention have been depicted in the figures in which identical or equivalent elements bear the same reference symbols.

DESCRIPTION OF THE PREFERRED EMBODIMENTS

Figure 3:
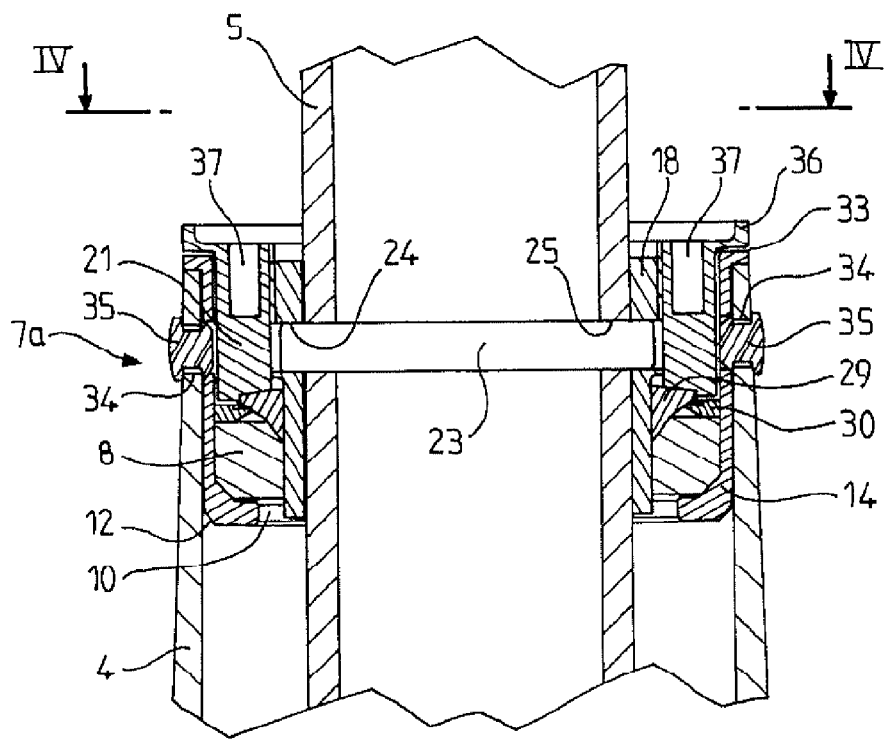
FIG. 3 is a view in section showing a headset according to a second embodiment of the invention, after it has been assembled onto the head tube of the bicycle frame.

A first embodiment will now be described with reference to FIGS. 1 and 2 which show the front part of a bicycle frame 1.

A top tube 2 and a down tube 3 are joined together by a head tube 4 which accepts a steering tube 5 which is made as one piece with the actual forks 6 that support the front wheel (not illustrated).

The headset 7 serves to connect the steering tube 5 to the head tube 4 for rotation. The headset 7 is made up of an upper part 7a comprising an upper bearing 8 and of a lower part 7b comprising a lower bearing 9. The upper 8 and lower 9 bearings are positioned respectively at the upper end and at the lower end of the head tube 4 so as to constitute a rotational connection between these two tubes.

The upper and lower bearings 8, 9 are housed respectively in an upper housing 10 and in a lower housing 11 which are delimited on the inside by a respective annular shoulder 12, 13 (see FIG. 2).

The upper and lower bearings 8, 9 are arranged in their respective housing 10, 11 with the interposition of a respective annular insert 14, 15 preferably made of aluminum. If need be, a split compensating ring 16, 17, as in patent FR2829989, is positioned between the annular insert and the respective bearing 8, 9.

In order to eliminate the axial float of the upper and lower bearings 8, 9, the headset 7 comprises clamping means for axially clamping the bearings 8, 9 which force them toward one another.

According to the invention, these means of axially clamping the bearings 8, 9 comprise, in the upper part 7a of the headset 7, a threaded sleeve 18 slipped over the steering tube 5; in the example illustrated, the threaded sleeve 18 extends in such a way that it is inserted between the upper bearing 8 and the steering tube 5.

Connecting means secure this threaded sleeve 18 to the steering tube 5 in terms of rotation and in terms of translation. The screw thread 19 of the sleeve 18 is able to collaborate with the tapped thread 20 of a tapped annular cap 21 which on its exterior periphery has protrusions 22 intended to provide a better purchase for tightening, whether this tightening is done by hand or using a tool.

The screw thread 19 of the sleeve 18 extends over an upper end part of the sleeve, this end part having an additional thickness by comparison with the rest of the sleeve which is plain and which represents approximately ¾ of the length of the sleeve.

According to one important feature of the invention, the connecting means that connect the sleeve 18 to the steering tube 5 comprise a pin 23 which extends through two diametrically opposed holes 24 in the threaded sleeve 18 so as to be housed in two diametrically opposed holes 25 provided in the steering tube 5 so as to connect the threaded sleeve to the latter in terms of rotation and axially lock these two elements together.

When the threaded sleeve 18 is being fitted onto the steering tube 5, the diametrically opposed holes 24 in the threaded sleeve 18 and said diametrically opposed holes 25 in the steering tube 5 are aligned with one another by guide means comprising at least one recess 26 and at least one projection 27 of complementary shape which are provided in the interface between said threaded sleeve and the steering tube.

In the example illustrated, two recesses 26 are provided. Each recess here consists of a flat made on the exterior face of the steering tube and in which one of the opposed holes 25 of the steering tube 5 is positioned. The flat 26 is elongate and extends as far as the free end of the steering tube 5 so as to collaborate with a projection 27 constituting an additional thickness provided on the threaded sleeve 18 at the site of the two diametrically opposed holes 24 thereof.

The projection 27 is visible in FIG. 4 which will be described later on with reference to the second embodiment.

In this way, the flats 26 and the projections 27 serve as guide means when the headset 1 is being assembled around the steering tube 5 in order to align the holes 24 in the sleeve 18 with the holes 25 in the steering tube 5 and in order, after assembly, to contribute to the securing of the sleeve to the latter tube in terms of rotation and to the strengthening of the region around the holes 24 in the threaded sleeve 18.

It is also possible to conceive of providing just one flat 26 on the steering tube 5 and just one projection of complementary shape 27 on the interior face of the threaded sleeve 18 in order to obtain the same functionality of guiding and securing together in terms of rotation of these two parts, although it is preferable to provide two of them, for reasons of rigidity.

The headset 7 according to the invention is very simple to assemble. The upper and lower annular inserts 14, 15 are bonded into their respective housing 10, 11 at the ends of the head tube 4 during manufacture of the frame. Assembly starts at the lower part 7b by slipping the bearing 9 and, where appropriate, the play-compensating split ring 17 onto the steering tube 5 so that the bearing 9 rests on the forks 6 on a frustonical bearing surface 28 at the bottom end of the steering tube.

Next, the steering tube 5 is introduced into the head tube 4 so that its free end projects out of this tube to leave the holes 25 in the steering tube 5 accessible above the head tube 4. The parts of the upper part 7a of the headset 7 are then slipped onto the steering tube 5, fitting the compensating split ring 16 where appropriate, and next the bearing 8 into the upper annular insert 14 prebonded into the upper housing 10 in the head tube 4.

A compression ring 29 is advantageously positioned on the bearing 8, as is a first seal 30 already fixed to the annular cap 21 and covering at least a peripheral part of the upper end of the annular insert 14.

The threaded sleeve 18 is then slipped onto the steering tube 5 and slid downwards, guided by its projections 27 which collaborate with the flats 26 of the steering tube 5 until the holes 24 in the sleeve 18 are aligned with the holes 25 in the steering tube 5. The pin 23 can then be inserted into the holes 24, 25 to secure the sleeve 18 to the steering tube 5 in terms of rotation and in terms of translation.

To complete assembly, a second seal 31 is fitted into a groove 32 provided inside the tapped annular cap 21 which is then screwed onto the threaded sleeve 18, applying thrust to the upper bearing 8 via the compression ring 29.

When the tapped annular cap 21 is screwed onto the threaded sleeve 18, it passes over the holes 24 in the threaded sleeve 18 so as to trap the pin 23 in its fitted position.

Of course, the parts are dimensioned so that when the annular cap 21 has been screwed far enough onto the threaded sleeve 18 to obtain the desired level of clamping, the lower end of the annular cap 22 lies near the free end of the steering tube 5 to leave only a small gap 33 between these two elements.

Figure 4:
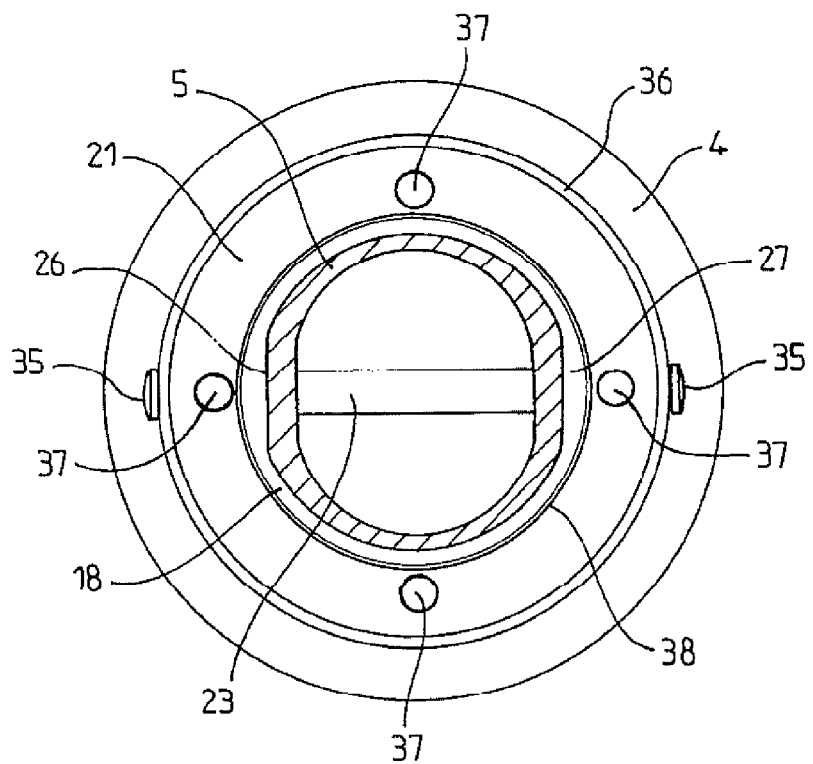
FIG. 4 is a view from above, partially in section on IV-IV of FIG. 3.

FIGS. 3 and 4 illustrate a second embodiment which differs from the first embodiment essentially in that the tapped annular cap 21 is practically incorporated into the head tube 4.

More specifically, the greater part of the tapped annular cap 21 is dimensioned to lie inside the head tube 4. However, this means that the holes 25 in the steering tube 5 and the holes 24 in the threaded sleeve 18 are no longer directly accessible from the outside. For this reason, two diametrically opposed holes 34 are made in the head tube 4, near the end thereof. These holes 34 thus allow the pin 23 to be introduced into the holes 24, 25 to secure the threaded sleeve 18 in terms of rotation to the steering tube 5 and to lock it axially thereon.

The holes 34 in the head tube 4 are closed by plugs 35 to seal them while improving the look of the assembly.

The tapped annular cap 21 in this embodiment has at its upper end a flange 36 which, after assembly, remains outside the head tube 4 so as to extend over the upper end thereof.

In order to allow this tapped annular cap 21 to be screwed onto the threaded sleeve 18, the cap on its upper face is provided with recesses which, in the example illustrated, are in the form of bores 37 that allow a suitable tool (not depicted) that has projections which complement the bores to be used to turn the annular cap in one direction or in the other in order respectively to fit or remove it.

In the example illustrated, these bores are four in number evenly distributed around the central hole 38 in the annular cap 21.

Of course, it is conceivable to provide just two bores, these being diametrically opposed about the central hole 38.

According to the second embodiment, the upper surface of the threaded sleeve 18 is preferably covered by a protective washer (not depicted) which on its underside may have protrusions designed to fit into the bores 37. Such a washer, without protrusions, may be formed by the annular insert described in the applicant company's patent application FR0504817 which relates to a bicycle handle bar stem with adjustable inclination.

The headset according to the invention is not restricted to use on a carbon-fiber steering tube but may of course be used on more conventional, metal elements.

Nor is the invention restricted to the examples illustrated and described; a person skilled in the art can readily imagine other alternative forms, for example using other types of bearings than rolling bearings, without thereby departing from the scope of the invention.

The invention claimed is:

1. A bicycle headset capable of connecting a steering tube to a head tube that forms part of a bicycle frame, made up of an upper part comprising an upper bearing and of a lower part comprising a lower bearing, said upper and lower bearings being housed inside the head tube so as to allow the steering tube to turn with respect thereto, and clamping means for axially clamping said lower and upper bearings against, respectively, a lower end and an upper end of the head tube, said axial-clamping means comprising, in the upper part of the headset, a threaded sleeve slipped over the steering tube, said threaded sleeve being secured to the steering tube by connecting means and is able to collaborate with a tapped annular cap slipped over the steering tube so as to force the upper bearing downwards as said tapped annular cap is screwed onto said threaded sleeve, wherein said connecting means comprise a pin extending through two diametrically opposed holes in the threaded sleeve so as to be housed in two diametrically opposed holes provided in the steering tube.

2. The headset as claimed in claim 1, wherein as said threaded sleeve is being mounted on the steering tube, said diametrically opposed holes in the threaded sleeve and said diametrically opposed holes in the steering tube are aligned with one another by guide means comprising at least one recess and at least one projection of complementary shape which are provided in the interface between said threaded sleeve and the steering tube.

3. The headset as claimed in claim 2, wherein said at least one recess has at least one flat provided on the exterior face of the steering tube extending as far as the free end of the steering tube to collaborate with said at least one projection which constitutes an additional thickness on the interior face of said threaded sleeve at the site of one of its two opposed holes.

4. The headset as claimed in claim 3, wherein the at least one projection includes two projections and the at least one flat includes two flats are provided on the exterior face of the steering tube, these extending as far as the free end of the steering tube to collaborate with two projections constituting additional thicknesses of complementary shape provided on the interior face of said threaded sleeve at the site of its two opposed holes.

5. The headset as claimed in claim 1, wherein the greater part of said tapped annular cap can be housed inside the head tube and in that the latter comprises, near its upper end, two diametrically opposed holes allowing said pin to be fitted and removed.

6. The headset as claimed in claim 5, wherein said tapped annular cap at its upper end has a flange which, after assembly, is situated outside the head tube so as to extend on the upper end thereof.

7. The headset as claimed in claim 6, wherein said holes in the head tube are closed by plugs to seal them.

8. The headset as claimed in claim 5, wherein said holes in the head tube are closed by plugs to seal them.

9. The headset as claimed in claim 1, wherein said annular cap on its upper surface is provided with recesses evenly distributed around the central hole in said annular cap and able to collaborate with a suitable tool so that said annular cap can be turned when the headset is being assembled or disassembled.

10. The headset as claimed in claim 9, wherein at least two diametrically opposed recesses are provided on the upper surface of said annular cap.

11. The headset as claimed in claim 1, wherein when the tapped annular cap is screwed onto the threaded sleeve, it passes over the holes in the threaded sleeve so as to trap the pin in its fitted position.

12. A bicycle comprising a headset as claimed in claim 1.

* * * * *